United States Patent
Kikuchi et al.

(10) Patent No.: US 9,064,510 B1
(45) Date of Patent: Jun. 23, 2015

(54) SUSPENSION ASSEMBLY, HEAD SUSPENSION ASSEMBLY AND DISK DEVICE WITH THE SAME

(71) Applicant: Kabushiki Kaisha Toshiba, Minato-ku, Tokyo (JP)

(72) Inventors: Takafumi Kikuchi, Yokohomo Kanagawa (JP); Yasutaka Sasaki, Yokohama Kanagawa (JP); Takuma Kido, Mitaka Tokyo (JP); Kenichiro Aoki, Machida Tokyo (JP); Masaya Kudo, Yokohama Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/522,331

(22) Filed: Oct. 23, 2014

(30) Foreign Application Priority Data

Aug. 6, 2014 (JP) .................................. 2014-160462

(51) Int. Cl.
*G11B 5/39* (2006.01)
(52) U.S. Cl.
CPC ........................................ *G11B 5/39* (2013.01)

(58) Field of Classification Search
USPC ........................................................ 360/294.3
See application file for complete search history.

(56) References Cited

U.S. PATENT DOCUMENTS

| 8,542,465 | B2 * | 9/2013 | Liu et al. ..................... | 360/294.4 |
|---|---|---|---|---|
| 8,913,348 | B2 * | 12/2014 | Higuchi et al. ............ | 360/294.4 |
| 2011/0149440 | A1 * | 6/2011 | Uematsu et al. ........... | 360/245.3 |
| 2014/0022675 | A1 | 1/2014 | Hanya et al. | |
| 2014/0268427 | A1 * | 9/2014 | Hogan et al. ............... | 360/245.4 |

FOREIGN PATENT DOCUMENTS

JP 2014-017038 A 1/2014

* cited by examiner

*Primary Examiner* — Mark Blouin
(74) *Attorney, Agent, or Firm* — White & Case LLP

(57) ABSTRACT

According to one embodiment, a suspension assembly includes a support plate including a distal end portion, a trace member attached to the support plate, an elastic supporting member made from a distal end portion of the trace member and configured to support a head, and an actuation element expandable/contractible in the longitudinal direction of the trace member, at least a part of a bottom of which is adhered to a seating surface formed from a cover insulating layer of the trace member.

20 Claims, 13 Drawing Sheets

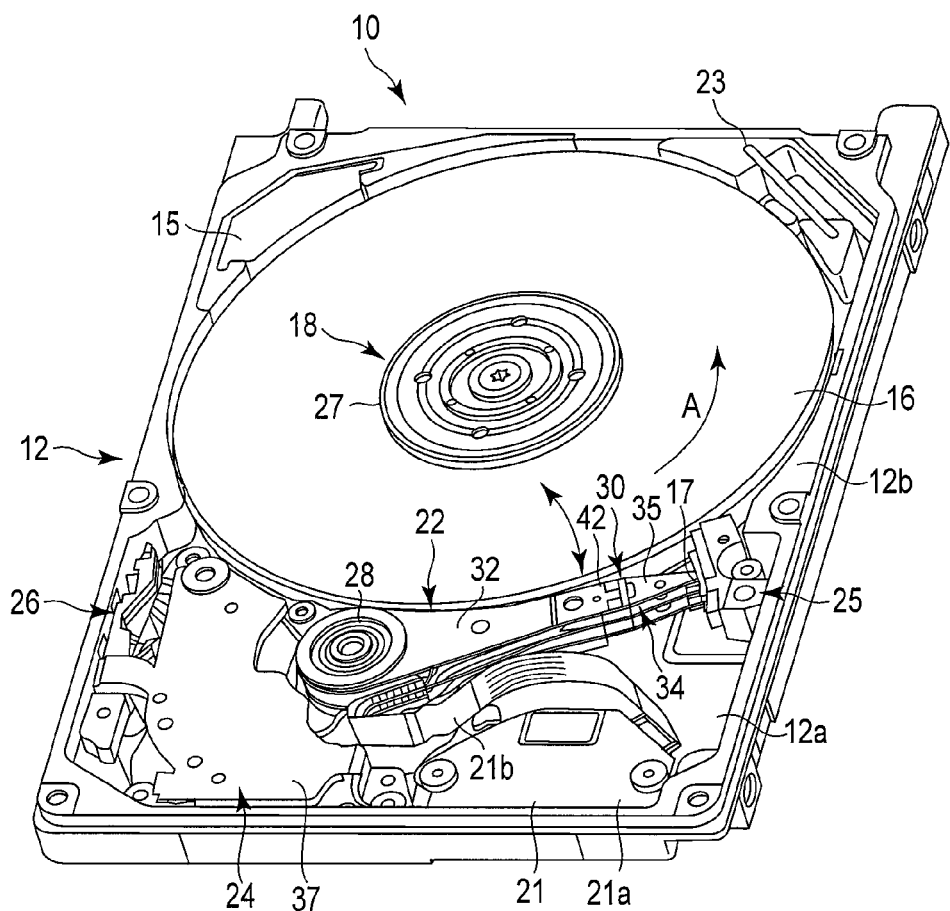
F I G. 1
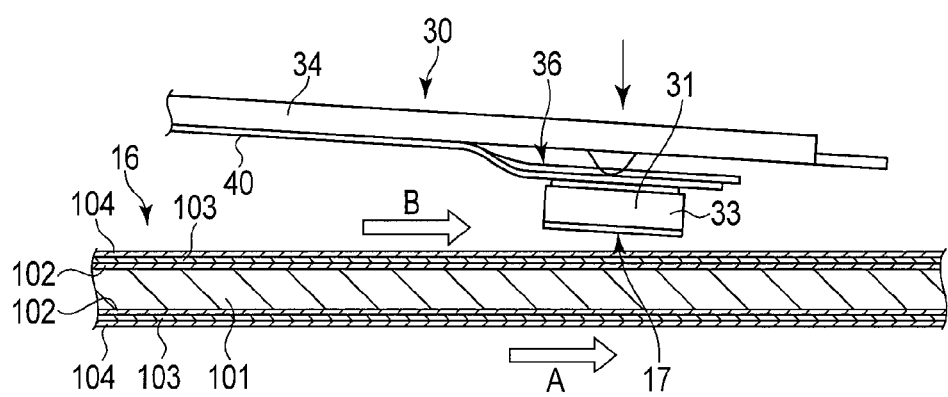
F I G. 2

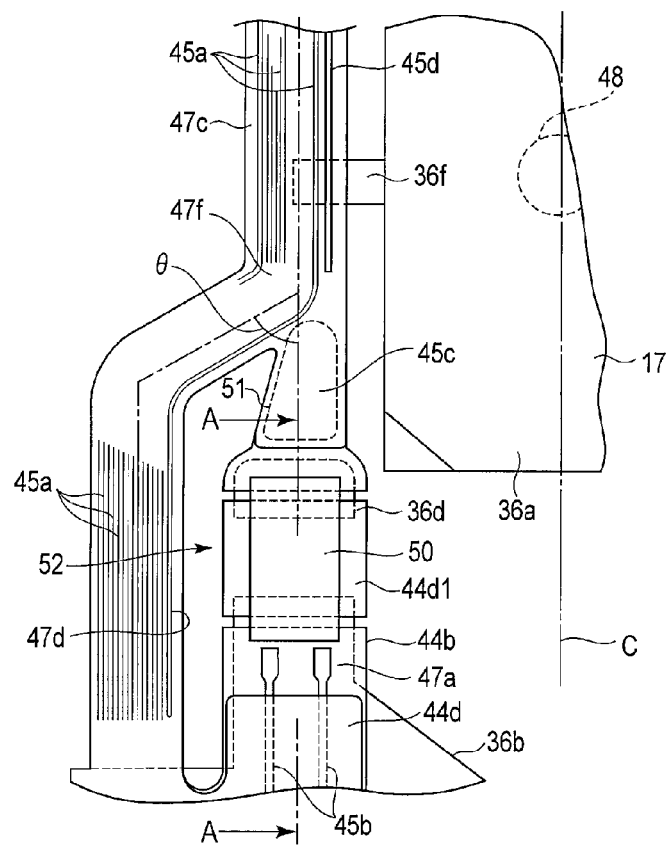
F I G. 7
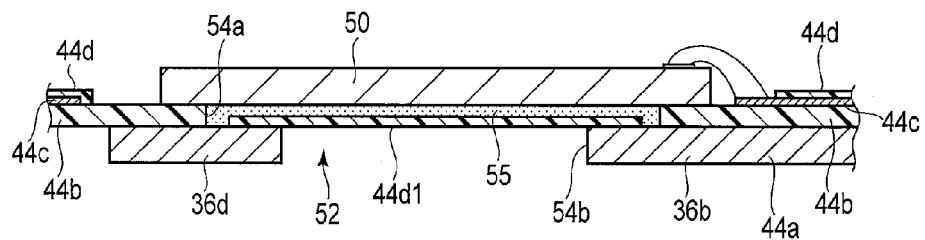
F I G. 8

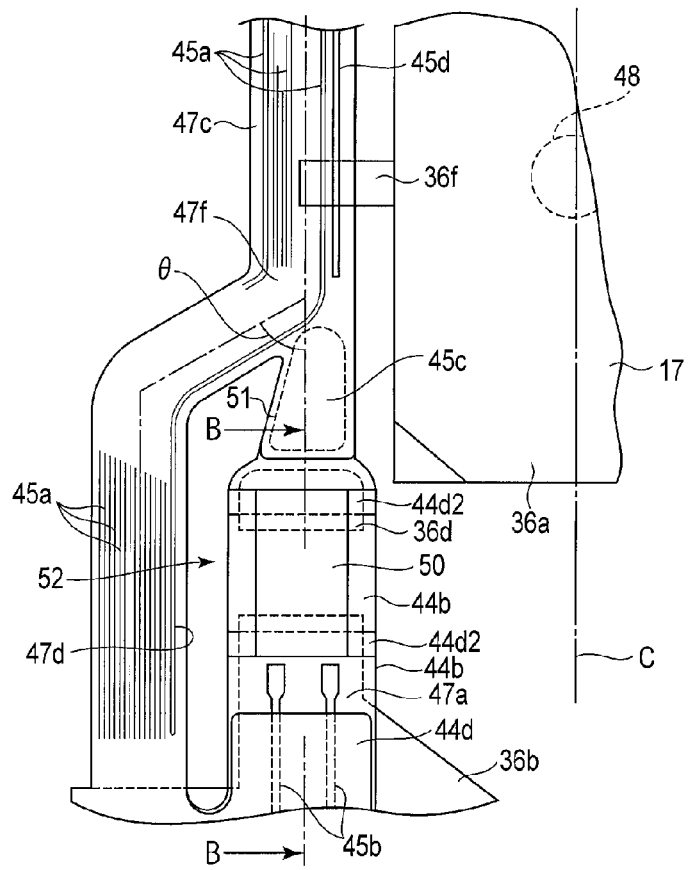
F I G. 10
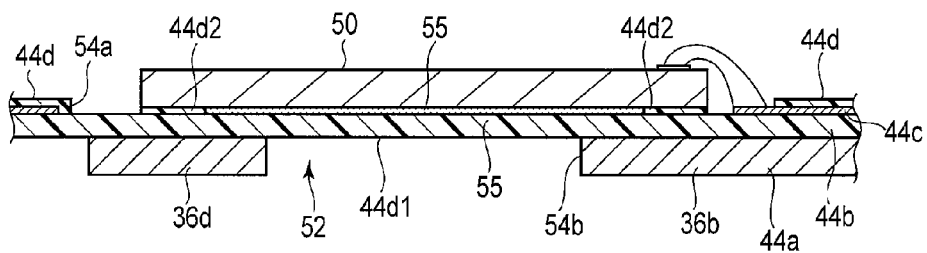
F I G. 11

SUSPENSION ASSEMBLY, HEAD SUSPENSION ASSEMBLY AND DISK DEVICE WITH THE SAME

CROSS-REFERENCE TO RELATED APPLICATIONS

This application is based upon and claims the benefit of priority from Japanese Patent Application No. 2014-160462, filed Aug. 6, 2014, the entire contents of which are incorporated herein by reference.

FIELD

Embodiments described herein relate generally to a suspension assembly, a head suspension assembly and a disk device provided with the same.

BACKGROUND

In recent years, disk devices such as magnetic disk drives and optical disk drives have widely been used as external storage devices and image recording devices of computers.

As such a disk device, for example, a magnetic disk drive generally comprises a magnetic disk provided in a case, a spindle motor which supports and rotates the magnetic disk, and a suspension assembly which supports a magnetic head. The suspension assembly includes a suspension attached to a distal end portion of an arm, and a trace member (a flexure or a wiring trace) provided on the suspension. The trace member includes a gimbal portion which supports the magnetic head.

In more recent years, there is proposed a suspension assembly wherein thin piezoelectric elements (PZT elements) serving as actuation elements are mounted in the vicinity of a gimbal portion of a trace member, and a magnetic head is minutely displaced in a seek direction by expansion and contraction of the piezoelectric elements. According to the suspension assembly, the operation of the magnetic head can be minutely controlled by controlling a voltage to be applied to the piezoelectric elements.

In the suspension assembly, each PZT element is fixed by its entire surface to a base insulating layer of the trace member. But the PZT elements are very small, and consequently a very high precision adhesion process is required. More specifically, if control of the amount of adhesive applied is insufficient, a PZT element may become detached, or the adhesive may ooze or flow out around an inappropriate region. Further, if preliminary curing of the adhesive is not carried out properly, a PZT element may be left floating or the like. In this case, it is difficult to stably transmit the driving force produced by the expansion and contraction of the piezoelectric elements to the trace member. As a result, the stroke is decreased and the dispersion of the stroke increased.

BRIEF DESCRIPTION OF THE DRAWINGS

FIG. 1 is a perspective view showing a hard disk drive (HDD) according to a first embodiment;

FIG. 2 is a side view showing a magnetic head and a suspension of a suspension assembly in the HDD, and a magnetic disk;

FIG. 7 is an enlarged plan view showing part of a gimbal portion of the suspension assembly;

FIG. 8 is a cross-sectional view of an actuation element mounting area of the gimbal portion, which is taken along line A-A in FIG. 7;

FIG. 10 is an enlarged plan view showing a part of a gimbal portion of a suspension assembly according to a second embodiment;

FIG. 11 is a cross-sectional view of an actuation element mounting area of the gimbal portion, which is taken along line B-B in FIG. 10;

DETAILED DESCRIPTION

Figure 3:
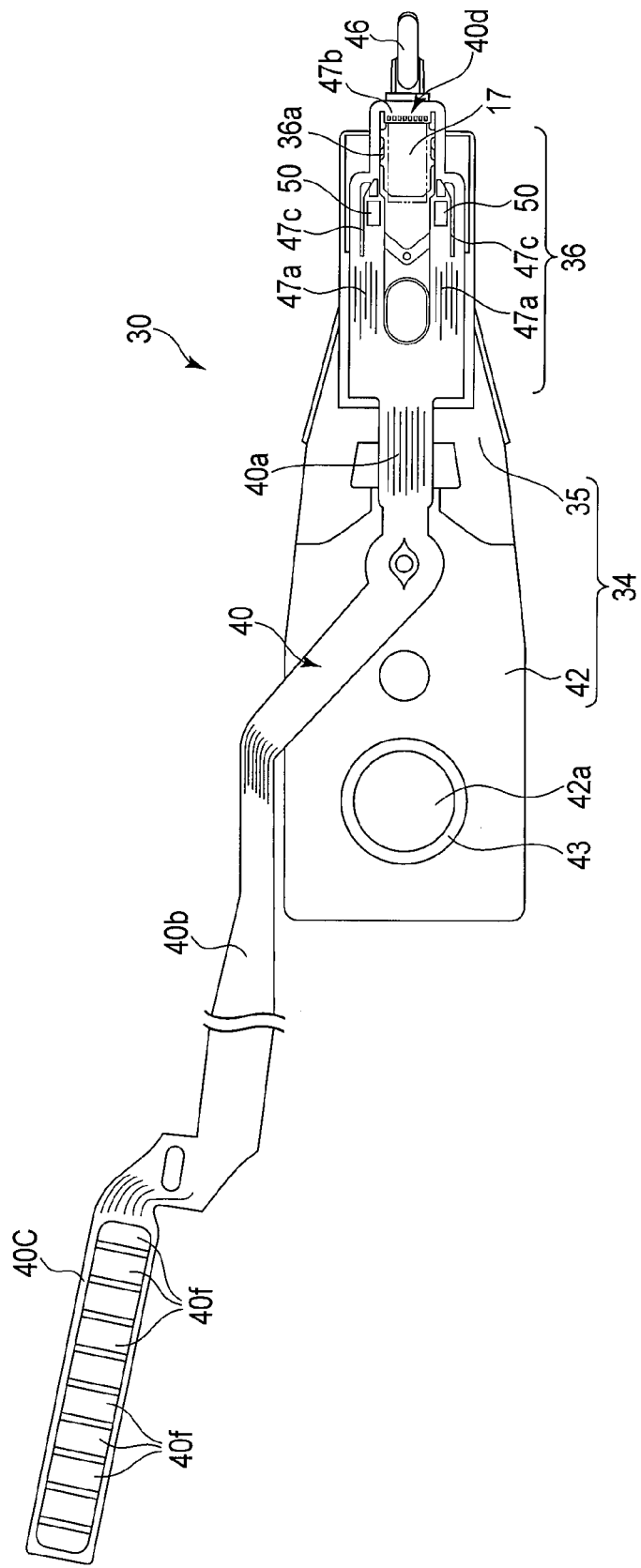
FIG. 3 is a plan view of the suspension assembly.

Various embodiments will be described hereinafter with reference to the accompanying drawings. In general, according to one embodiment, a suspension assembly comprises a support plate including a distal end portion; a trace member formed elongate and attached to the support plate and comprising a thin metallic plate, a base insulating layer on the thin metallic plate, a conductive layer on the base insulating layer to form a plurality of traces and a cover insulating layer thinner than the base insulating layer; an elastic supporting member made from a distal end portion of the trace member which is located above the distal end portion of the support plate, and configured to support a head; and an actuation element expandable/contractible in a longitudinal direction of the trace member and comprising a bottom surface at least a part of which is adhered to a seating surface formed of the cover insulating layer.

A hard disk drive (HDD) according to an embodiment, which functions as a disk device, will be explained in detail.

First Embodiment

FIG. 1 shows an internal structure of an HDD, with a top cover detached therefrom, and FIG. 2 schematically shows a magnetic disk and a magnetic head being in a flying state. As shown in FIG. 1, the HDD comprises a housing 10. The housing 10 comprises a base 12 formed in the shape of a rectangular box which is open on its upper side, and a top cover (not shown) fixed to the base 12 by a plurality of screws to cover an upper opening of the base 12. The base 12 includes a rectangular bottom wall 12a and a side wall 12b provided upright along a peripheral edge of the bottom wall 12a.

In the housing 10 are arranged two magnetic disks 16 as recording mediums, and a spindle motor 18 provided as a driving section which supports and rotates the magnetic disks 16. The spindle motor 18 is disposed on the bottom wall 12a. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12. The magnetic disks 16 are rotated at a predetermined speed by the spindle motor 18 in a direction indicated by arrow A.

A plurality of magnetic heads 17 and a head stack assembly (hereinafter referred to as an HSA) 22 are arranged in the housing 10. The magnetic heads 17 are configured to write and read information on and from the magnetic disks 16, and the HSA 22 supports the magnetic heads 17 such that they are movable with respect to the magnetic disks 16. In the housing 10 are arranged a voice coil motor (VCM) 24, a ramp load mechanism 25, a latch mechanism 26 and a board unit 21. The VCM 24 rotates and positions the HSA 22, the ramp load mechanism 25 holds the magnetic heads 17 in unload positions where they are separated from the magnetic disks 16, when the magnetic heads 17 are moved to outermost circumferential part of the magnetic disks 16, the latch mechanism 26 holds the HSA in a retreat position when an impact or the like acts on the HDD, and the board unit 21 includes a conversion connector, etc.

A printed circuit board (not shown) is attached to an outer surface of the bottom wall 12a of the base 12. The printed circuit board controls operations of the spindle motor 18, the VCM 24 and the magnetic heads 17 through the board unit 21. A circulation filter 23 configured to capture dust caused in the housing 10 by the operations of the movable parts is provided on the side wall 12b of the base 12, and is positioned outside the magnetic disks 16. Further, a breather filter 15 configured to capture dust from the air flowing into the housing 10 is provided on the side wall 12b of the base 12.

As shown in FIG. 1, the HSA 22 comprises a rotatable bearing unit 28, four arms 32 attached to the bearing unit 28 in a stacked state, suspension assemblies 30 respectively extending out from the arms 32, and spacer rings (not shown) provided between the arms 32 arranged in the stacked state. Each of the arms 32 is formed of, for example, stainless steel, aluminum or the like into an elongate and thin plate-shape. Each arm 32 includes a distal end portion at its extended end side. At the distal end portion, a caulking seating face having a caulking hole (not shown) is formed.

As shown in FIGS. 1 and 2, each of the magnetic disks 16 comprises a substrate 101 formed of a nonmagnetic substance and in the shape of a disc having a diameter of approximately 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material exhibiting a soft magnetic characteristic.

As shown in FIG. 2, each of the magnetic heads 17 is formed as a flying type head, and comprises a slider 31 formed in a substantially rectangular parallelepiped shape, and a head section 33 formed in an outflow end (trailing) side of the slider. Each magnetic head 17 is supported on a distal end portion of a suspension 34 by a gimbal portion 36 of a flexure, which will be described later. Each magnetic head 17 is flied by airflow B which is generated between a surface of the magnetic disk 16 and the slider 31 by rotation of the magnetic disk 16. The direction of airflow B is coincident with a rotating direction of the magnetic disk 16. The slider 31 is arranged such that its longitudinal direction is substantially coincident with the direction of airflow B with respect to the surface of the magnetic disk 16.

Next, structures of the suspension assemblies 30 will be explained in detail. FIG. 3 is a plan view of each of the suspension assemblies 30, and FIG. 4 is a perspective view of each suspension assembly.

Figure 4:
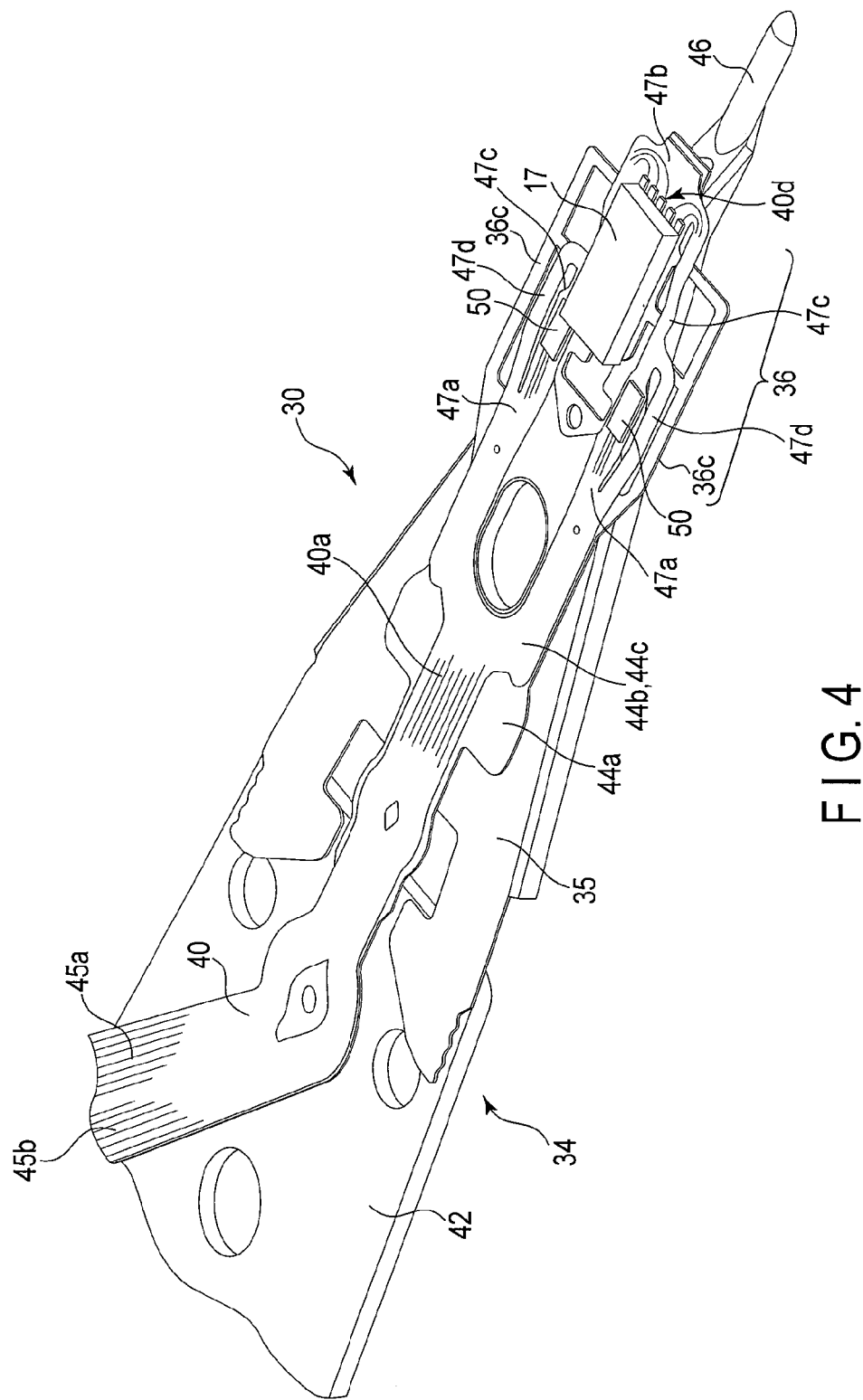
FIG. 4 is a perspective view showing the suspension assembly.

As shown in FIGS. 1, 3 and 4, each suspension assembly 30 comprises the suspension 34 extending from the arm 32, and the magnetic head 17 supported on the extended end of the suspension 34. Note that the combination of the magnetic head 17 and the suspension assemblies 30 will be called head suspension assembly.

The suspension 34, which functions as a supporting plate, includes a rectangular base plate 42 formed of a metal plate having a thickness of several hundreds of microns, and a load beam 35 formed of a metal plate with a thickness of tens of microns in a shape of an elongate and thin leaf spring. The load beam 35 has a proximal end portion located on a distal end portion of the base plate 42, and is fixed to the base plate 42 by welding a plurality of portions of the load beam 35. The proximal end portion of the load beam 35 has a width substantially equal to that of the base plate 42. An elongate and thin rod-shaped tab 46 is provided at the distal end of the load beam 35 in a protruding manner.

The base plate 42 includes, at a proximal-end portion thereof, a circular opening 42a, and annular protrusion 43 positioned around the opening 42a. By fitting the protrusion 43 of the base plate 42 in the circular caulking hole (not shown) formed in the seating face for caulking provided on the arm 32, and caulking the protrusion 43, the base plate 42 is fastened to the distal-end portion of the arm 32. The distal end of the base plate 42 may be fixed to the distal end of the arm 32 by spot welding or adhesion.

The suspension assembly 30 comprises a pair of piezoelectric elements (PTZ elements) 50 and a flexure (trace member) 40 formed in the shape of an elongate belt-shape and configured to transmit a recording signal and a reproduction signal for the magnetic head 17 and an actuation signal for the piezoelectric elements 50. As shown in FIGS. 3 and 4, the flexure 40 includes a distal end portion 40a attached to upper surfaces of the load beam 35 and the base plate 42, and a posterior-half portion (extension portion) 40b extending outwards from a side edge of the base plate 42 and along a side edge of the arm 32. Also, the flexure 40 includes a connecting end portion 40c which is located at a distal end of the extension portion 40b and comprises a plurality of connection pads 40f, and also which is connected to a main FPC 21b which will be described later.

The distal end portion of the flexure 40, which is located on the distal end portion of the load beam 35, forms the gimbal portion 36 functioning as an elastic supporting member. The magnetic head 17 is mounted on the gimbal portion 36. The magnetic head 17 is fixed onto the gimbal portion 36, and is supported on the load beam 35 through the gimbal portion 36. The pair of piezoelectric elements (PZT elements) 50 functioning as actuation elements are attached to the gimbal portion 36, and located in the vicinity of the magnetic head 17 on the proximal end side of the load beam 35 with respect to the magnetic head 17.

Figure 5:
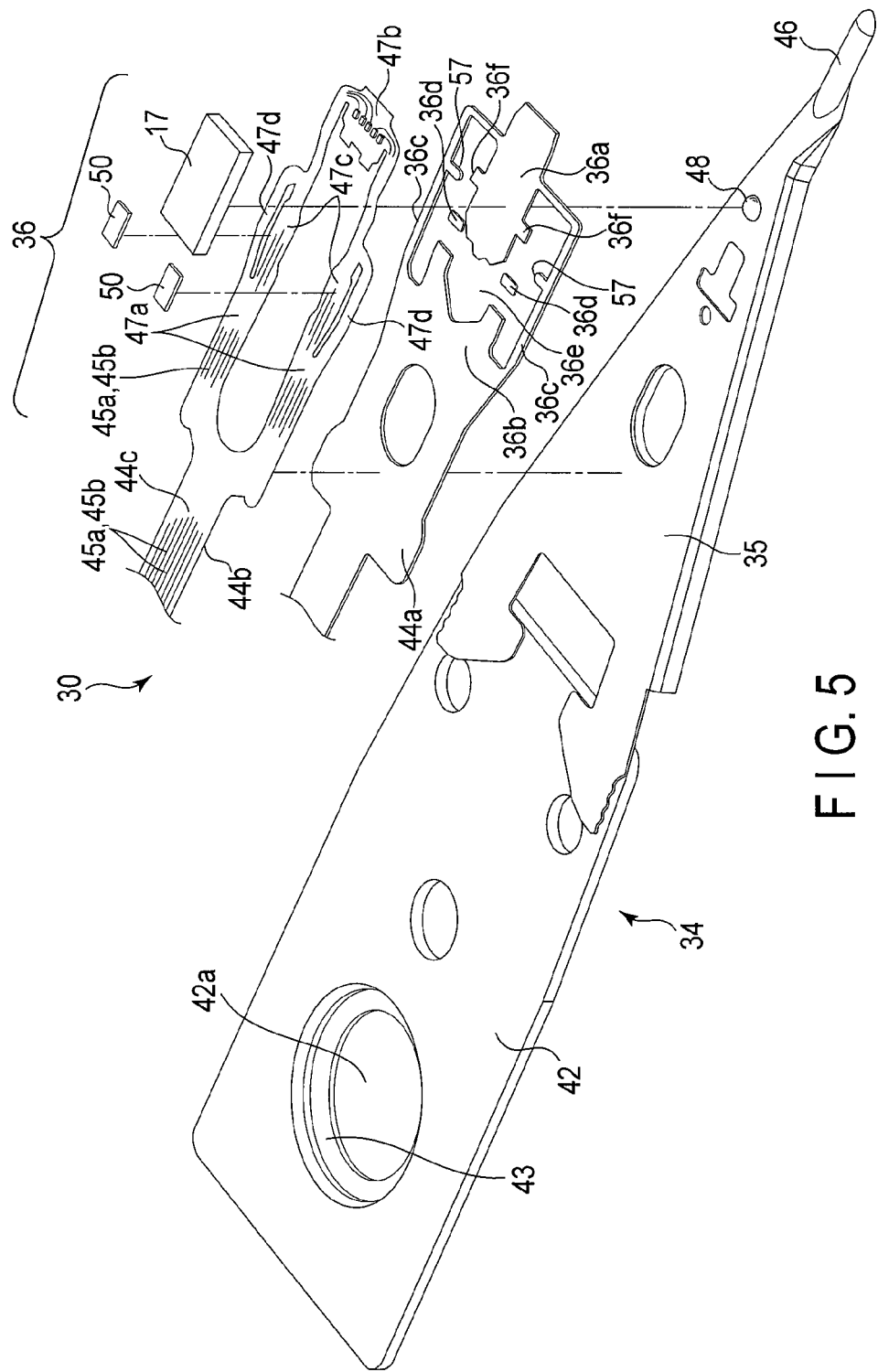
FIG. 5 is an exploded perspective view showing the magnetic head, piezoelectric elements, a flexure and a load beam of the suspension assembly.
Figure 6:
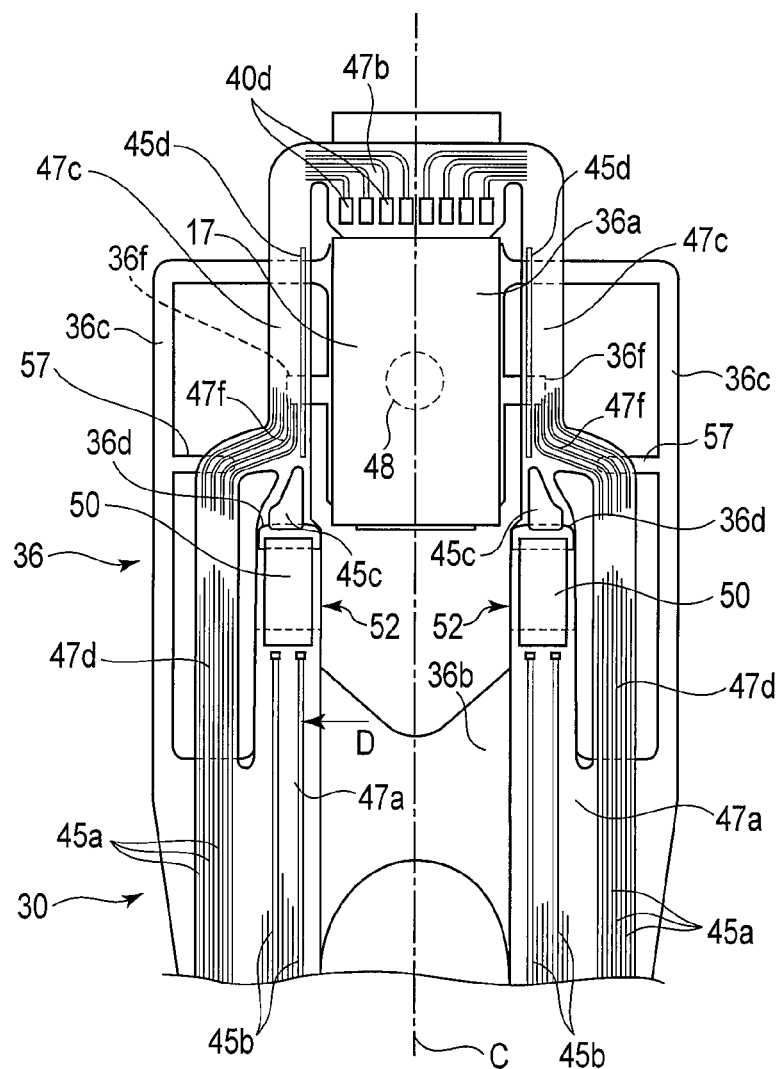
FIG. 6 is a plan view of a distal end portion of the suspension assembly.

FIG. 5 is an exploded perspective view of the magnetic head, the piezoelectric elements, the flexure and the load beam of each suspension assembly 30; FIG. 6 is a plan view of the distal end portion of each suspension assembly 30; and FIG. 7 is a plan view enlargedly showing part of the gimbal portion.

As shown in FIGS. 3 to 6, the flexure 40 comprises a thin metallic plate (lining layer) 44a formed as a base and also formed of stainless or the like, a base insulating layer 44b formed on the thin metallic plate 44a, a conductive layer (trace pattern) 44c forming a plurality of signal traces 45a and actuation traces 45b formed on the insulating layer 44b, and a cover insulating layer (protection layer) 44d stacked on the base insulating layer 44b to cover the conductive layer 44 (see FIGS. 7 and 8). The flexure 40 constitutes an elongate-band shaped lamination plate. The distal end portion 40a of the flexure 40 is attached to the surfaces of the load beam 35 and base plate 42 at the thin metallic plate 44a side thereof by adhering or laser welding.

At the gimbal portion 36 of the flexure 40, the thin metallic plate 44a includes: a rectangular tongue portion 36a located at a distal end side of the gimbal portion 36; a rectangular proximal end portion 36b located on a proximal end side of the gimbal portion 36, with a space 36e interposed between the proximal end portion 36b and the tongue portion 36a; a pair of elongate outrigger portions (link portions) 36c extending from the tongue portion 36a to the proximal end portion 36b; a pair of island-shaped support portions 36d located between the tongue portion 36a and the proximal end portion 36b and also located in the space 36e; and a pair of handles (support projections) 36f projecting from both side edges of the tongue portion 36a.

The proximal end portion 36b is fixed onto a surface of the load beam 35 by laser welding or the like. The tongue portion 36a is arranged such that its central axis is coincident with a central axis C of the suspension 34. A substantially central portion of the tongue portion 36a is in contact with a dimple (convex portion) 48 projectingly provided at the distal end portion of the load beam 35. Thereby, when the magnetic disk moves, the tongue portion 36a and the magnetic head 17 mounted on the tongue portion 36a can flexibly follow to variation of the surface of the magnetic disk in a roll direction and a pitch direction and minutely fly. The pair of handles 36f are formed of thin metallic plate 44a integrally with the tongue portion 36a, and project from the both side edges of the tongue portion 36a in a direction substantially perpendicular to the center axis C. It should be noted that a member forming the handles (support projections) 36f is not limited to the thin metallic plate 44a; that is, the handles 36f may be formed of the conductive layer 44c stacked on the thin metallic plate 44a, the base insulating layer 44b or the cover insulating layer 44d.

At the gimbal portion 36, part of the base insulating layer 44b of the flexure 40 is formed to branch into two parts located on opposite sides with respect to the central axis C of the suspension 34. The base insulating layer 44b includes: proximal end portions 47a fixed onto the proximal end portion 36b of the thin metallic plate 44a; a distal end portion 47b bonded onto the tongue portion 36a; a pair of band-shaped first bridge portions 47c extending from the proximal end portions 47a to the distal end portion 47b; and a pair of band-shaped second bridge portions 47d located abreast with the first bridge portions 47c and extending from the proximal end portions 47a to middle portions of the first bridge portions 47c to join the first bridge portions 47c. The first bridge portions 47c are located abreast with the outriggers 36c on the both sides of the tongue portion 36a, and extend in substantially parallel with the central axis C of the suspension 34, i.e., along the longitudinal direction of the load beam 35. Also, the first bridge portions 47c extend over the handles 36f and crossbars of the outriggers 36c, and are partially fixed to the handles 36f and the crossbars. It should be noted that the outriggers 36c may be provided between the tongue portion 36a and the first bridge portions 47c. If they are provided in such a manner, the first bridge portions 47c are partially fixed to the handles 36f.

As shown in FIGS. 6 and 7, the second bridge portions 47d are located between the first bridge portions 47c and the outriggers 36c, and extend abreast with the first bridge portions 47c and the outriggers 36c. The second bridge portions 47d join the first fridge portions 47c at joining portions 47f located close to the handles 36f. At the joining portions 47f, an angle θ between each of the first bridge portions 47c and a respective one of the second bridge portions 47d is set to fall within the range of 45° to less than 90°. The pair of island-shaped support portions 36d of the thin metallic plate 44a are located between the joining portions 47f and the proximal end portion 47a and fixed to the first bridge portions 47c.

At the gimbal portion 36, the conductive layer 44c includes a plurality of signal traces 45a extending from the proximal end portion 47a of the base insulating layer 44b to the distal end portion 47b through the second bridge portions 47d, the joining portions 47f and the first bridge portions 47c; and actuation traces 45b extending from the proximal end portion 47a to middle portions of the first bridge portions 47c. The signal traces 45a are connected to a plurality of electrode pads 40d provided at the distal end portion 47b. The conductive layer 44c includes reinforcement trace portions 45c formed on the first bridge portions 47c in respective positions close to the joining portions 47f and the support portions 36d. The conductive layer 44c may include ground traces or dummy traces 45d which extend to the handle 36f over the first bridge portions 47c. It should be noted that the actuation traces 45b are provided to extend from the proximal end portions 47a to the middle portions of the first bridge portions 47c through the second bridge portions 47d and the joining portions 47f.

As shown in FIG. 7, one of end portions of each reinforcement trace portion 45c is located to overlap with the support portion 36d, and the other is located to overlap with the joining portion 47f. In the embodiment, the reinforcement trace portion 45c and the first bridge portion 47c include inclined edges 51 which gradually become thinner from the support portion (36d) side (i.e., the actuation element side to be described later) toward the joining portion 47f such that they are inclined toward the central line C of the suspension. Since such inclined edges 51 are provided, it is possible to adjust a central position of rotation of the magnetic head 17, which accompanies extension and contraction of the piezoelectric elements 50, which will be described later, such that the central position of rotation is located above the central line C of the suspension.

As shown FIG. 6, at the gimbal portion 36, the first bridge portions 47c, the second bridge portions 47d, the outriggers 36c and the traces 45a and 45b are located on the both sides of the tongue portion 36a, and provided bilaterally symmetrical with respect to the central axis C of the suspension 34. In the embodiment, the gimbal portion 36 includes auxiliary bridges 57 located close to the joining portions 47f to extend between the outriggers 36c and the second bridge portions 47d. The auxiliary bridges 57 are formed of projections of the thin metallic plate 44a, which extend from the outriggers 36c.

As shown in FIGS. 3 to 7, the magnetic head 17 is fixed to the tongue portion 36a by an adhesive. The magnetic head 17 is arranged such that its axis is coincident with the central axis C of the suspension 34, and a substantially central portion of the magnetic head 17 is located on the dimple 48. Record and reproduction elements of the magnetic head 17 are electrically joined to the electrode pads 40d of the distal end portion 47b by soldering or a conductive adhesive such as a sliver paste. Thereby, the magnetic head 17 is connected by the electrode pads 40d to the signal traces 45a, which are provided to transmit a record and reproduction signal.

As the pair of piezoelectric elements 50, which serve as actuation elements, for example, thin film piezoelectric elements (PZT elements) formed in the shape of a rectangular plate are applied. The piezoelectric elements 50 are not limited to thin film type one (a thickness of about 10 µm); and a bulk type of or a bulk lamination (a thickness of 50 µm or more) type of piezoelectric elements may be applied as the piezoelectric elements 50. The piezoelectric elements 50 are not limited to PZT elements; that is, another type of piezoelectric elements may be applied as the piezoelectric elements 50. Furthermore, the actuation elements are not limited to the piezoelectric elements 50; that is, as the actuation elements, members configured to expand and contract by an applied voltage may be applied.

FIG. 8 is a cross-sectional view of a piezoelectric element mounting area, which is taken along line A-A in FIG. 7. As shown in FIGS. 6 to 8, the two piezoelectric elements 50 are bonded to the first bridge portions 47c by an adhesive agent 52 or the like. The piezoelectric elements 50 are disposed such that the longitudinal direction (elongation/contraction direction) of the piezoelectric elements 50 is parallel to longitudinal directions of the load beam 35 and bridge portions 47c. Thus, the piezoelectric elements 50 are arranged in parallel with each other and on the left and right sides of the magnetic head 17. However, the piezoelectric elements 50 may also be disposed in such a manner as to be inclined with respect to the longitudinal direction of the bridge portions 47c. For example, the two piezoelectric elements 50 may be arranged in an inverted V shape.

As shown in FIGS. 6 to 8, each first bridge portion 47c of the gimbal portion 36 comprises a mounting area 52 in which a respective piezoelectric element 50 is to be mounted. In the mounting area 52, the respective piezoelectric element 50 is mounted. The piezoelectric element 50 is fixed by adhesion onto a seating face at least part of which is formed of the cover insulating layer 44d.

The mounting area 52 comprises a first opening 54a formed in the base insulating layer 44b, a second opening (space) 54b defined between the proximal end portion 36b and the support portion 36d of the thin metallic plate 44a, and a cover insulating layer 44d1 covering the second opening 54b of the thin metallic plate 44a. The cover insulating layer 44d1 comprises both ends located respectively on the proximal end portion 36b and the support portion 36d of the thin metallic plate 44a. The cover insulating layer 44d1 is formed to be thinner than the base insulating layer 44b.

The piezoelectric element 50 is disposed to oppose the first opening 54a, with both longitudinal (elongation/contraction) end portions thereof being supported on the base insulating layer 44b and a central portion thereof being adhered to the cover insulating layer 44d1 and the thin metallic plate 44a with an adhesive 55 filled in the first opening 54a. That is, the central portion of the piezoelectric element 50 is fixed by adhesion to a seating face formed of the cover insulating layer 44d1.

In the longitudinal direction of the piezoelectric elements 50, one of end portions of each piezoelectric element 50 is located to overlap with the proximal end portion 36b of the thin metallic plate 44a, and the other is bonded to the first bridge portion 47c, while overlapping with the support portion 36d. The piezoelectric elements 50 are electrically connected to the actuation traces 45b, which are provided to transmit an actuation signal.

Figure 9:
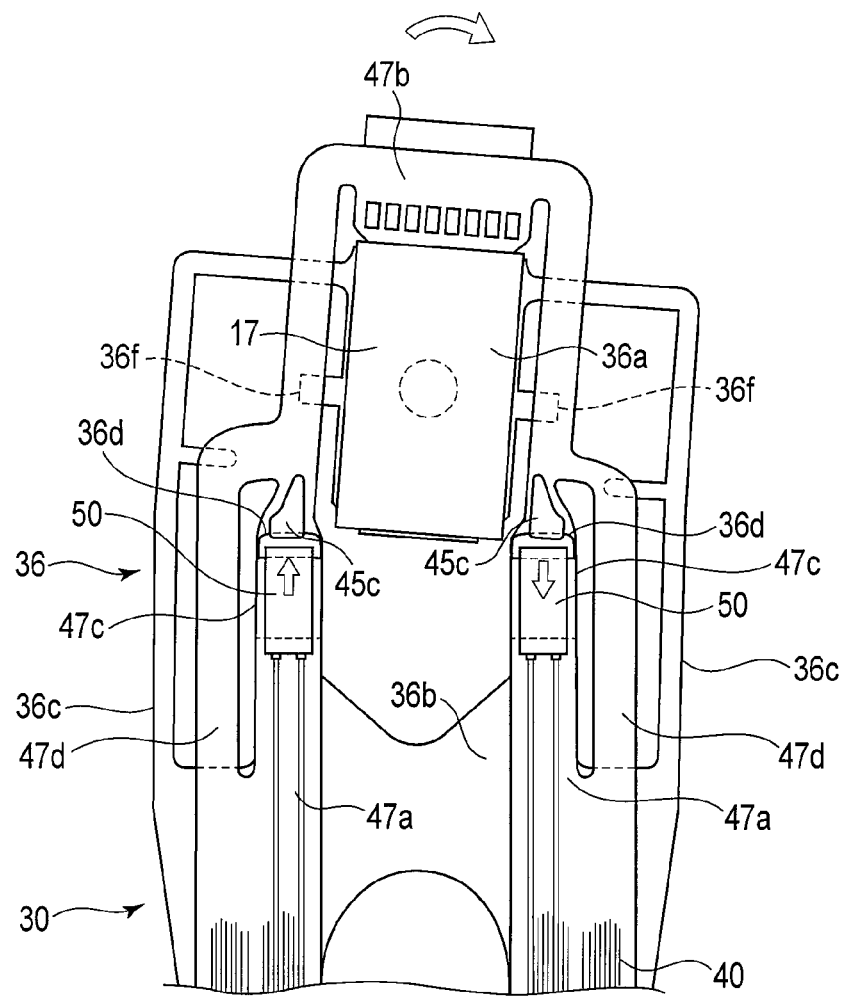
FIG. 9 is a plan view schematically showing a minute displacement state of the magnetic head due to a piezoelectric element.

The piezoelectric elements 50 are extended or contracted in their longitudinal direction when a voltage is applied to the piezoelectric elements 50 through the actuation traces 45b. To be more specific, as shown in FIG. 9, the piezoelectric elements 50 are driven in opposite directions where they expand and contract, to thereby cause the first bridge portions 47c to rock the tongue portion 36a of the gimbal portion 36 and also displace the magnetic head 17 in a seek direction.

As shown in FIG. 1, the HSA 22 includes a support frame extending from the bearing unit 28 in a direction away from the arms 32, and the support frame includes a voice coil which is embedded therein, and which forms part of the VCM 24. Each of the magnetic disks 16 is located between associated two of the suspension assemblies 30, with the HSA 22 mounted in the base 12. While the HDD is being operated, the magnetic heads 17 of the HGAs 30 face upper and lower surfaces of the magnetic disks 16, and are located on both sides of the magnetic disks 16. The voice coil, which is fixed to the support frame, is located between a pair of yokes 37 fixed onto the base 12. The voice coil, the yokes 37 and a magnet (not shown) fixed to one of the yokes 37 constitute the VCM 24.

As shown in FIG. 1, the board unit 21 includes a main flexible print circuit board (hereinafter referred to as a main FPC) 21b extending from a main body 21a thereof. An extended end of the main FPC 21b forms a connecting end portion, and is fixed in the vicinity of the bearing unit 28 of the HSA 22. The connecting end portion 40c of the flexure 40 of each suspension assembly 30 is mechanically and electrically connected to the connecting end portion of the main FPC 21b. Thereby, the board unit 21 is electrically connected to the magnetic heads 17 and the piezoelectric elements 50 by the main FPC 21b and the flexures 40.

In the HDD and the suspension assembly 30 with the above mentioned structure, a voltage is applied to the piezoelectric elements 50 through the flexures (trace member) 40, thereby enabling the magnetic head 17 attached to the gimbal portion 36 to be displaced in the seeking direction. By virtue of this feature, it is possible to minutely control the position of the magnetic head 17 by controlling the voltage to be applied to the piezoelectric elements 50, and thus improve the accuracy of positioning of the magnetic head.

In the mounting area 52 of each piezoelectric element 50, the cover insulating layer 44d1 is disposed in the first opening 54a of the base insulating layer 44b, and the central portion of the piezoelectric element 50 is fixed by adhesion to the seating face formed of the cover insulating layer 44d1. Here, since the cover insulating layer 44d1 is thinner than the base insulating layer 44b, a gap of several micrometers is retained between the central portion of the piezoelectric element 50 and the cover insulating layer 44d1. As the adhesive 55 spreads within the gap while wet, the piezoelectric element 50 can be stably adhered and fixed. At the same time, the adhesive 55 is confined within the gap so that the creeping of the adhesive to the front side of the piezoelectric element 50 can be prevented. Young's modulus of the adhesive 55 is about half that of the base insulating layer 44b. Therefore, in comparison with the conventional case of the seating face in which the entire surface of a piezoelectric element is adhered to a base insulating layer, it is possible according to this embodiment to suppress the adverse effect on the adhesion structural part caused by the deformation of the piezoelectric element 50. Thus, the stroke per unit voltage can be increased without changing the characteristics or size of the piezoelectric element 50.

With the above-described structures, it is possible to obtain a suspension assembly, head suspension assembly and a disk device provided therewith, which can achieve stable adhesion and fixing of the actuation elements, and increase the stroke without changing the characteristics or size of the piezoelectric elements.

Next, suspension assemblies according to the other embodiments and modifications will be explained. With respect to the other embodiments and modifications, elements identical to those in the first embodiment will be denoted by the same reference numerals and signs, and their detailed explanations will be omitted.

Second Embodiment

FIG. 10 is a plan view showing a gimbal portion in a suspension assembly according to a second embodiment. FIG. 11 is a cross-sectional view of an actuation element mounting area of the gimbal portion, which is taken along line B-B in FIG. 10. According to the second embodiment, a mounting area 52 of a piezoelectric element 50 comprises a first opening 54a formed by removing a cover insulating layer 44d and a conductive layer 44c, and a second opening (space) 54b defined between a proximal end portion 36b and a support portion 36d of a thin metallic plate 44a. A base insulating layer 44b is formed on the proximal end portion 36b and the support portion 36d such as to extend over the second opening (space) 54b. Two island-shaped cover insulating layers 44d2 are formed on the base insulating layer 44b, and are located in the first opening 54a. The two cover insulating layers 44d2 are disposed on the proximal end portion 36b and the support portion 36d of the thin metallic plate 44a.

The piezoelectric element 50 is disposed in the first opening 54a, with both longitudinal (expansion/contraction) end portions thereof being supported on the cover insulating layer 44d2. The central portion of the piezoelectric element 50 is disposed to oppose the base insulating layer 44b with a gap equivalent to the thickness of the cover insulating layer 44d. The gap is filled with adhesive 55, and the central portion the piezoelectric elements 50 is fixed by adhesion to the base insulating layer 44b with the adhesive 55.

In the longitudinal direction of the piezoelectric elements 50, one of end portions of each piezoelectric element 50 is located to overlap with the proximal end portion 36b of the thin metallic plate 44a, and the other is bonded to a first bridge portion 47c, while overlapping with the support portion 36d. The piezoelectric elements 50 are electrically connected to actuation traces 45b, which are provided to transmit an actuation signal.

According to the second embodiment with the above-described structure, both end portions in the expansion/contraction direction of each piezoelectric element 50 are supported and fixed on the cover insulating layer 44d2. A gap equivalent to the thickness of the cover insulating layer 44d2 is retained between the central portion of the piezoelectric element 50 and the base insulating layer 44b. Then, the adhesive 55 spreads within the gap while wet, and thus stable adhesion and fixing of the piezoelectric elements 50 can be realized. In this manner, it is possible to obtain a suspension assembly, head suspension assembly and a disk device provided therewith, which can achieve stable adhesion and fixing of the actuation elements.

First Modification

Figure 12:
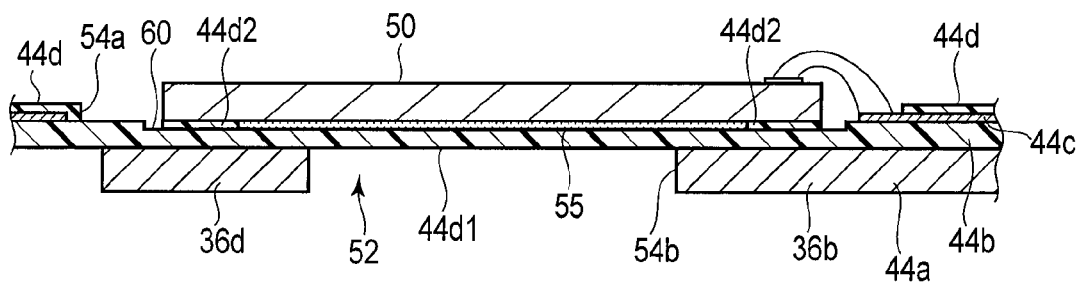
FIG. 12 is a cross-sectional view of an actuation element mounting area of a gimbal portion according to a first modification.

FIG. 12 is a cross-sectional view of a mounting area of a suspension assembly according to a first modification.

According to this modification, an top surface side of the base insulating layer 44b is subjected to half-etching in a mounting area 52 of a piezoelectric element, and thus a recess portion 60 having a depth of about a half of the thickness of a base insulating layer 44b is formed. In the recess portion 60, an island-like cover insulating layer 44d2 and a piezoelectric elements 50 are provided. With this structure, the piezoelectric elements 50 can be disposed closer by the thickness of the recess portion 60 to a thin metallic plate 44a.

Third Embodiment

Figure 13:
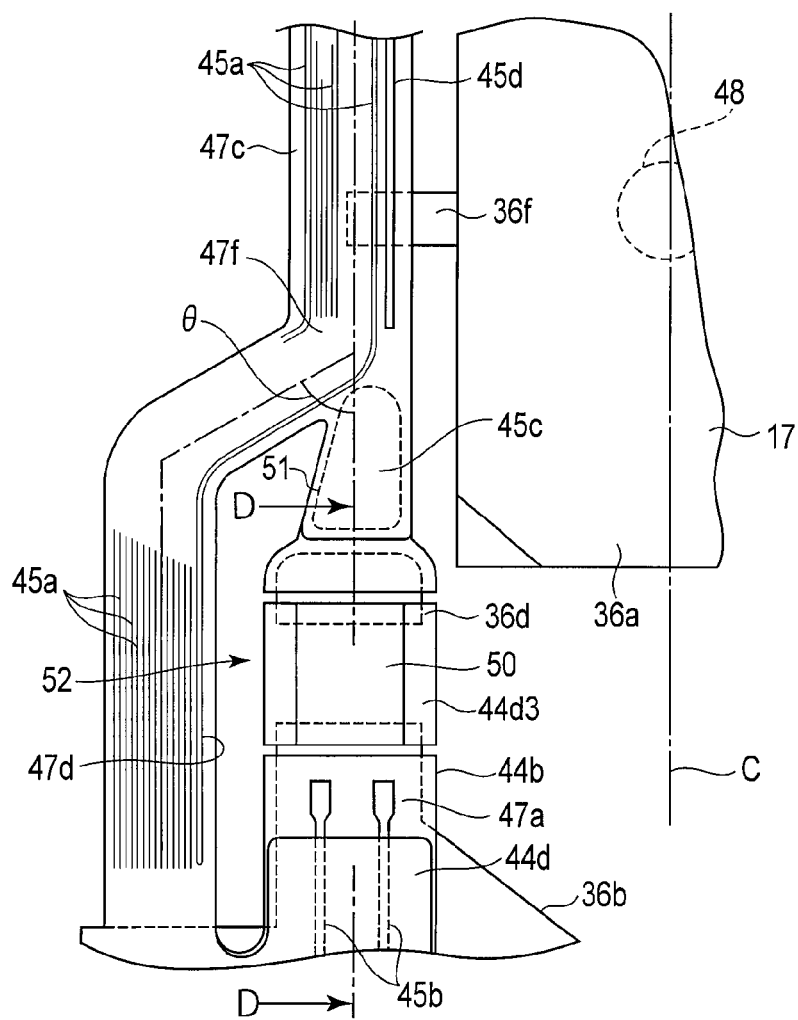
FIG. 13 is an enlarged plan view showing a part of a gimbal portion of a suspension assembly according to a third embodiment.
Figure 14:
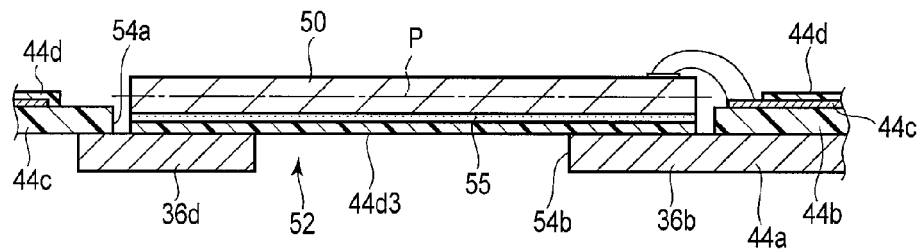
FIG. 14 is a cross-sectional view of an actuation element mounting area of the gimbal portion, which is taken along line D-D in FIG. 13.

FIG. 13 is a plan view showing a gimbal portion in a suspension assembly according to a third embodiment. FIG. 14 is a cross-sectional view of an actuation element mounting area of the gimbal portion, which is taken along line D-D in FIG. 13. According to the third embodiment, a mounting area 52 of each piezoelectric element 50 comprises a first opening 54a formed in a base insulating layer 44b, a second opening (space) 54b defined between a proximal end portion 36b and a support portion 36d of a thin metallic plate 44a, and a cover insulating layer 44d3 disposed in the first opening 54a and covering the second opening 54b of the thin metallic plate 44a. Both end portions of the cover insulating layer 44d3 are disposed respectively on the proximal end portion 36b and the support portion 36d of the thin metallic plate 44a.

The piezoelectric element 50 is disposed in the first opening 54a, and an entire surface thereof is adhered to the cover insulating layer 44d3 with adhesive 55. That is, the piezoelectric element 50 is fixed by adhesion to a seating face which is formed of the cover insulating layer 44d3.

In the longitudinal direction of the piezoelectric elements 50, one of end portions of each piezoelectric element 50 is located to overlap with the proximal end portion 36b of the thin metallic plate 44a, and the other is bonded to a first bridge portion 47c, while overlapping with the support portion 36d. The piezoelectric elements 50 are electrically connected to actuation traces 45b, which are provided to transmit an actuation signal.

According to the third embodiment with the above-described structure, the cover insulating layer 44d3 is disposed in the first opening 54a of the base insulating layer 44b, and the entire surface of the piezoelectric element 50 is adhered to the seating face which is formed of the cover insulating layer 44d3 in the mounting area 52 of each piezoelectric element 50. Here, since the cover insulating layer 44d3 is thinner than the base insulating layer 44b, a neutral surface P of the piezoelectric element 50 which deforms when a voltage is applied can be set closer to the thin metallic plate 44a in comparison with the conventional seating face structure in which the entire surface of a piezoelectric element is adhered to a base insulating layer. With this structure, it is possible to prevent part of the expansion or contraction of each piezoelectric element 50 from being lost as bending in the thickness direction. Thus, the stroke per unit voltage can be increased without changing the characteristics or size of the piezoelectric element 50.

As described above, according to the third embodiment as well, it is possible to obtain a suspension assembly, head suspension assembly and a disk device provided therewith, which can increase the stroke without changing the characteristics or size of the actuation elements.

Second Modification

Figure 15:
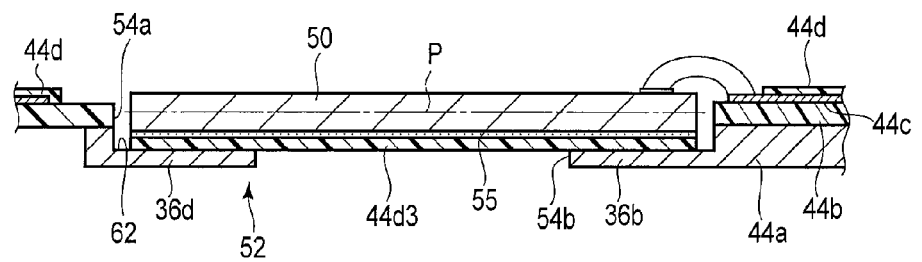
FIG. 15 is a cross-sectional view of an actuation element mounting area of a gimbal portion according to a second modification.

FIG. 15 is a cross-sectional view of a mounting area of a suspension assembly according to a second modification.

According to this modification, an top surface side of a thin metallic plate 44a (36b, 36d) in the above-described third embodiment is subjected to half-etching in a mounting area 52 of a piezoelectric element, and thus a recess portion 62 having a depth of about a half of the thickness of the thin metallic plate 44a is formed. In the recess portion 62, a cover insulating layer 44d3 and a piezoelectric element 50 are provided. With this structure, the piezoelectric elements 50 can be disposed closer by the thickness of the recess portion 62 to the thin metallic plate 44a. That is, a neutral surface P of the piezoelectric element 50 which deforms when a voltage is applied can be set closer to the thin metallic plate 44a.

Third Modification

Figure 16:
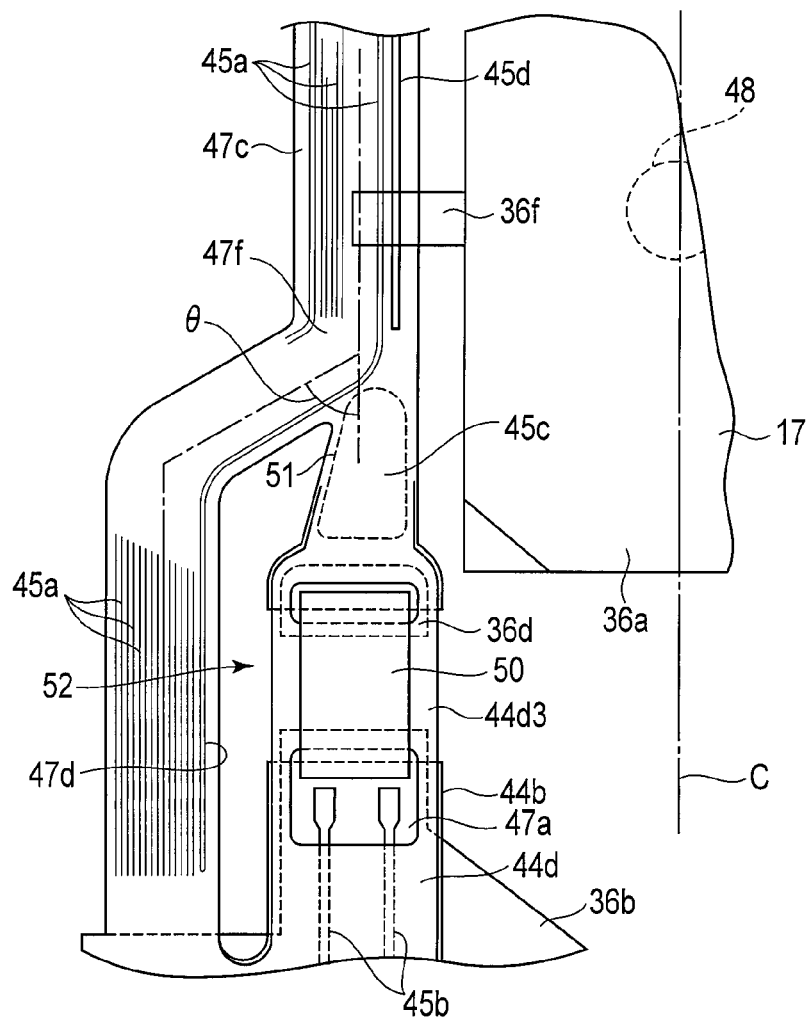
FIG. 16 is an enlarged plan view showing a part of a gimbal portion of a suspension assembly according to a third modification.

FIG. 16 is a plan view showing a gimbal portion in a suspension assembly according to a third embodiment. According to this modification, which is based on the above-described third embodiment, a cover insulating layer 44d3 which constitutes a seating face of a piezoelectric element 50, and another cover insulating layer 44d formed on a conductive layer 44c are formed to be connected to each other.

Fourth Modification

Figure 17:
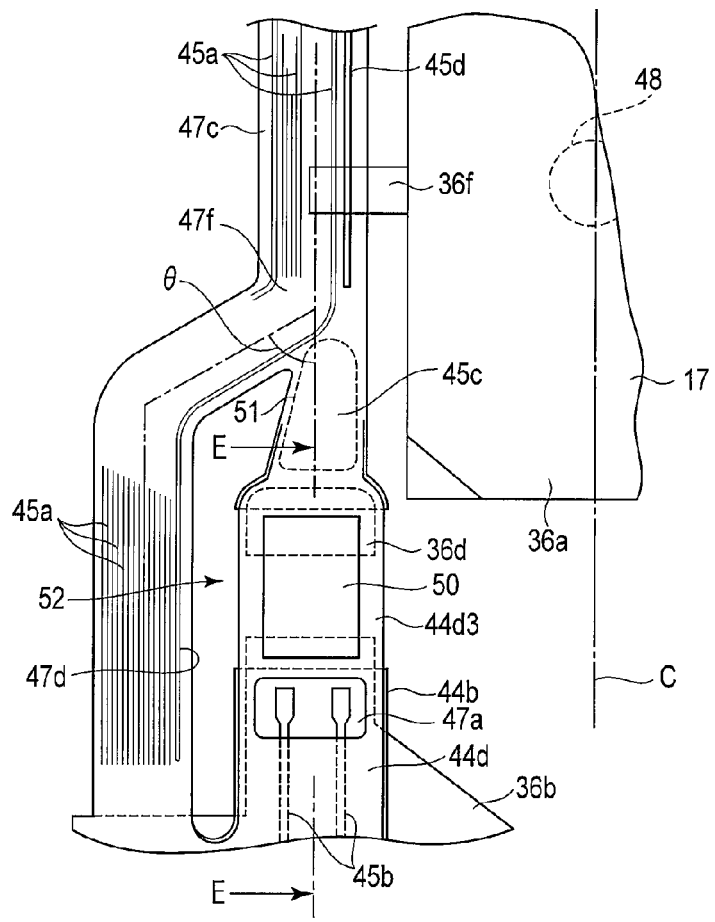
FIG. 17 is an enlarged plan view showing a part of a gimbal portion of a suspension assembly according to a fourth modification.
Figure 18:
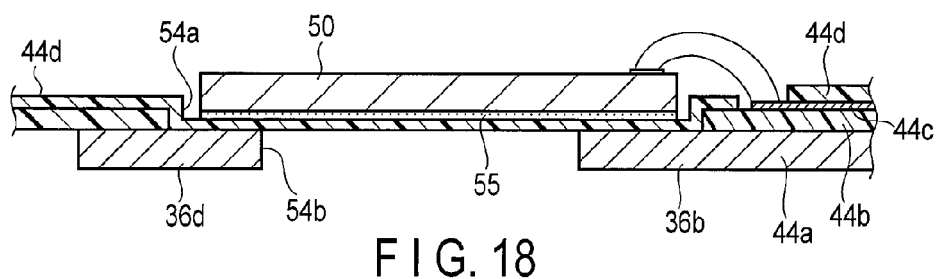
FIG. 18 is a cross-sectional view of an actuation element mounting area of the gimbal portion, which is taken along line E-E in FIG. 17.

FIG. 17 is a plan view showing a gimbal portions in a suspension assembly according to a fourth modification. FIG. 18 is a cross-sectional view of an actuation element mounting area, which is taken along line E-E in FIG. 17. According to this modification, which is based on the above-described third embodiment, a cover insulating layer 44d3 which constitutes a seating face of a piezoelectric element 50, and another cover insulating layer 44d formed on a conductive layer 44c are formed to be connected to each other. Both longitudinal end portions of the cover insulating layer 44d3 are connected to the base insulating layer 44b by both end portions in its width direction. Further, the cover insulating layer 44d3 extends over an entire region of a first opening 54a of the base insulating layer 44b, and covers a side edge of the base insulating layer 44b in its first opening (54a) side.

Fifth Modification

Figure 19:
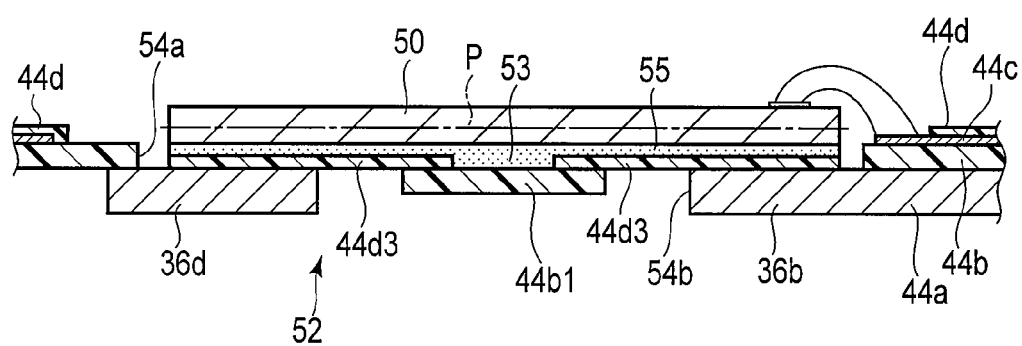
FIG. 19 is a cross-sectional view of an actuation element mounting area of a gimbal portion according to a fifth modification.

FIG. 19 is a cross-sectional view of a mounting area of a suspension assembly according to a fifth modification. According to this modification, a cover insulating layer 44d3 which constitutes a seating face of a piezoelectric element 50 in the above-described third embodiment may comprise a gap 53 or a though-hole at a position opposing a longitudinal central portion of a piezoelectric element 50. For example, the cover insulating layer 44d3 is split into two at a position of the longitudinal central portion of the piezoelectric element 50, and the two oppose each other with the gap 53 therebetween. The gap 53 or through-hole is capped with a cap body 44b1 formed of a base insulating layer 44b disposed in a second opening 54b. That is, the split two are joined to each other. In this manner, the gap 53 or through-hole, which is equivalent to the thickness of the cover insulating layer 44d3, is formed between the cap body 44b1 and the piezoelectric element 50. As the adhesive 55 spreads within the gap 53 or through-hole while wet, the piezoelectric element 50 can be stably adhered and fixed.

In the second to fifth modifications, an operational effect similar to that of the third embodiment described above can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above-described embodiments, an independent plate-shaped arm was used as the arm of the HSA, but the embodiments are not limited to this. For example, a type in which the so-called E-block-shaped arms and a bearing sleeve are formed integrally as one unit may be applied. The diameter of the magnetic disk is not limited to 2.5 inches, but other diameters may also be used. The number of magnetic disks is not limited to two, but may be one or three or more, in which case, the number of suspension assemblies may be adjusted in accordance with the number of magnetic disks provided.

What is claimed is:

1. A suspension assembly comprising:
a support plate including a distal end portion;
a trace member attached to the support plate and comprising a thin metallic plate, a base insulating layer on the thin metallic plate, a conductive layer on the base insulating layer to form a plurality of traces and a cover insulating layer thinner than the base insulating layer;
an elastic supporting member made from a distal end portion of the trace member which is located above the distal end portion of the support plate, and configured to support a head; and
an actuation element expandable/contractible in a longitudinal direction of the trace member and comprising a bottom surface at least a part of which is adhered to a seating surface formed from the cover insulating layer.

2. The suspension assembly of claim 1, wherein
the trace member comprises a mounting area in which the actuation element is mounted,
the mounting area comprises a first opening formed by removing a part of the base insulating layer, and a cover insulating layer provided in the first opening and on the thin metallic plate, and
the actuation element is disposed in the first opening and adhered to the cover insulating layer with adhesive.

3. The suspension assembly of claim 2, wherein
the mounting area comprises a recess portion formed in the thin metallic plate by etching within the first opening, and the cover insulating layer and the actuation element are disposed in the recess portion.

4. The suspension assembly of claim 2, wherein
the cover insulating layer extends continuously on the base insulating layer through a peripheral portion of the first opening.

5. The suspension assembly of claim 2, wherein
the cover insulating layer, within the first opening, comprises a gap or through-hole at a position opposing the actuation element, and
the mounting area comprises a second opening formed by removing a part of the thin metallic plate and opposing the first opening, and a cap portion made from base insulating layer and disposed in the second opening to cap the gap or through-hole of the cover insulating layer.

6. The suspension assembly of claim 1, wherein
the actuation element comprises both end portions in the longitudinal direction, supported on the thin metallic plate via the cover insulating layer.

7. The suspension assembly of claim 2, wherein
the actuation element comprises both end portions in the longitudinal direction, supported on the thin metallic plate via the cover insulating layer.

8. The suspension assembly of claim 1, wherein
the trace member comprises a mounting area in which the actuation element is mounted,
the mounting area comprises a first opening formed by removing a part of the base insulating layer, and a cover insulating layer provided in the first opening and on the thin metallic plate, and
the actuation element comprises both end portions in an expanding/contracting direction thereof, which are supported on the base insulating layer, and a central portion in the expanding/contracting direction, which is adhered to the cover insulating layer with adhesive filled in the first opening.

9. The suspension assembly of claim 1, wherein
the trace member comprises a mounting area in which the actuation element is mounted,
the mounting area comprises a first opening formed by removing a part of the cover insulating layer, and a pair of island-like cover insulating layers provided in the first opening and on the base insulating layer, and
the actuation element comprises both end portions in an expanding/contracting direction thereof, which are supported on the pair of island-like cover insulating layers, and a central portion in the expanding/contracting direction, which is adhered to the base insulating layer with adhesive filled between the pair of island-like cover insulating layers.

10. The suspension assembly of claim 9, wherein
the mounting area comprises a recess portion formed in the base insulating layer by etching within the first opening, and the island-like cover insulating layers and the actuation element are disposed in the recess portion.

11. A head suspension assembly comprising:
the suspension assembly of claim 1; and
a magnetic head supported on the suspension assembly.

12. The head suspension assembly of claim 11, wherein
the trace member comprises a mounting area in which the actuation element is to be mounted,
the mounting area comprises a first opening formed by removing a part of the base insulating layer, and a cover insulating layer provided in the first opening and on the thin metallic plate, and
the actuation element is disposed in the first opening and adhered to the cover insulating layer with adhesive.

13. The head suspension assembly of claim 11, wherein
the actuation element comprises both end portions in the longitudinal direction, supported on the thin metallic plate via the cover insulating layer.

14. The head suspension assembly of claim 11, wherein
the trace member comprises a mounting area in which the actuation element is mounted,
the mounting area comprises a first opening formed by removing a part of the base insulating layer, and a cover insulating layer provided in the first opening and on the thin metallic plate, and
the actuation element comprises both end portions in an expanding/contracting direction thereof, which are supported on the base insulating layer, and a central portion in the expanding/contracting direction, which is adhered to the cover insulating layer with adhesive filled in the first opening.

15. The head suspension assembly of claim 11, wherein
the trace member comprises a mounting area in which the actuation element is mounted,
the mounting area comprises a first opening formed by removing a part of the cover insulating layer, and a pair of island-like cover insulating layers provided in the first opening and on the base insulating layer, and
the actuation element comprises both end portions in an expanding/contracting direction thereof, which are supported on the pair of island-like cover insulating layers, and a central portion in the expanding/contracting direction, which is adhered to the base insulating layer with adhesive filled between the pair of island-like cover insulating layers.

16. A disk device comprising:
a disk recording medium;
the suspension assembly of claim 1; and
a magnetic head supported on the suspension assembly.

17. The disk device of claim 16, wherein
the trace member comprises a mounting area in which the actuation element is to be mounted,
the mounting area comprises a first opening formed by removing a part of the base insulating layer, and a cover insulating layer provided in the first opening and on the thin metallic plate, and
the actuation element is disposed in the first opening and adhered to the cover insulating layer with adhesive.

18. The disk device of claim 16, wherein
the actuation element comprises both end portions in the longitudinal direction, supported on the thin metallic plate via the cover insulating layer.

19. The disk device of claim 16, wherein
the trace member comprises a mounting area in which the actuation element is to be mounted,
the mounting area comprises a first opening formed by removing a part of the base insulating layer, and a cover insulating layer provided in the first opening and on the thin metallic plate, and
the actuation element comprises both end portions in an expanding/contracting direction thereof, which are supported on the base insulating layer, and a central portion in the expanding/contracting direction, which is adhered to the cover insulating layer with adhesive filled in the first opening.

20. The disk device of claim 16, wherein
the trace member comprises a mounting area in which the actuation element is to be mounted,
the mounting area comprises a first opening formed by removing a part of the cover insulating layer, and a pair of island-shaped cover insulating layers provided in the first opening and on the base insulating layer, and
the actuation element comprises both end portions in an expanding/contracting direction thereof, which are supported on the pair of island-like cover insulating layers, and a central portion in the expanding/contracting direction, which is adhered to the base insulating layer with adhesive filled between the pair of island-like cover insulating layers.

* * * * *